(12) United States Patent
Pietraszkiewicz et al.

(10) Patent No.: US 7,883,320 B2
(45) Date of Patent: Feb. 8, 2011

(54) ARTICLE HAVING DIFFUSER HOLES AND METHOD OF MAKING SAME

(75) Inventors: Edward F. Pietraszkiewicz, Southington, CT (US); Kevin J. Klinefelter, Uncasville, CT (US); Atul Kohli, Tolland, CT (US); Todd R. Coons, Gilbert, AZ (US)

(73) Assignee: United Technologies Corporation, Hartford, CT (US)

( * ) Notice: Subject to any disclaimer, the term of this patent is extended or adjusted under 35 U.S.C. 154(b) by 1513 days.

(21) Appl. No.: 11/041,791

(22) Filed: Jan. 24, 2005

(65) Prior Publication Data

US 2006/0163211 A1   Jul. 27, 2006

(51) Int. Cl.
*F01D 5/08* (2006.01)
(52) U.S. Cl. .................................... 416/97 R
(58) Field of Classification Search ......... 415/115–116; 416/96 R, 96 A, 97 R
See application file for complete search history.

(56) References Cited

U.S. PATENT DOCUMENTS

| | | | |
|---|---|---|---|
| 4,684,323 A * | 8/1987 | Field | 416/97 R |
| 5,637,239 A | 6/1997 | Adamski et al. | |
| 5,939,650 A | 8/1999 | Higuerey et al. | |
| 6,229,113 B1 * | 5/2001 | Brown | 219/121.7 |
| 6,267,552 B1 * | 7/2001 | Weigand | 415/115 |
| 6,359,254 B1 | 3/2002 | Brown | |
| 6,390,418 B1 | 5/2002 | McCormick et al. | |
| 6,627,833 B2 | 9/2003 | Varsell et al. | |
| 6,979,176 B2 * | 12/2005 | Nakamata et al. | 416/97 R |

OTHER PUBLICATIONS

Cover page and p. 208 of *Handbook of Hydraulic Resistance*, Second Edition, Revised and Augmented, by I.E. Idenchik, Hemisphere Publishing Co., a subsidiary of Harper & Row, 1986 NY USA.
Internet pp. 1 and 2 from www.nnoble.com/wire_EDM.htm, Normal Noble, Inc., "Superior Wire EDM, Plunge EDM and Conventional EDM" We are the "House of EDM".

* cited by examiner

*Primary Examiner*—Christopher Verdier
(74) *Attorney, Agent, or Firm*—Marjama Muldoon Blasiak & Sullivan LLP

(57) ABSTRACT

The diffusion opening in the cooling hole of an airfoil is formed by an EDM process in which the outwardly flaring sidewalls of the opening, rather then having surfaces that are approximated to be smooth by having many small ribs formed therein, are formed with relatively few ribs with both longitudinally extending and radially extending surfaces that are substantially greater in dimension than those as normally formed. In this manner, the machining process is simplified and expedited, while at the same time, the cooling efficiency is increased.

7 Claims, 2 Drawing Sheets

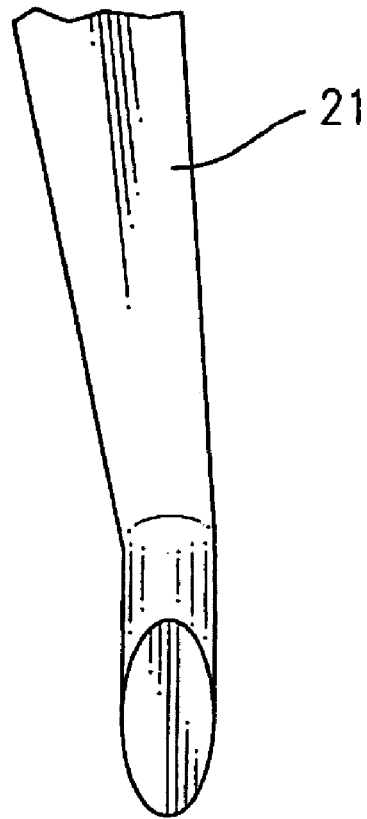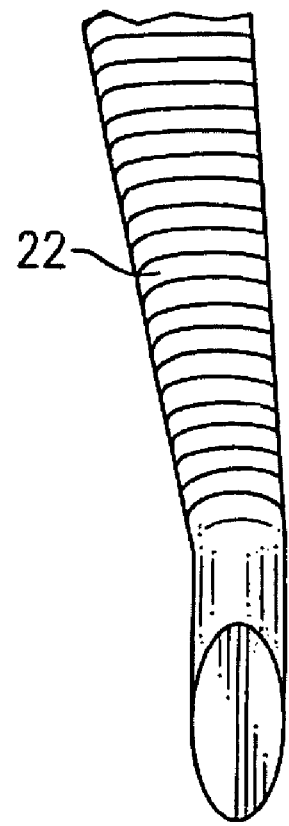
FIG.3A
Prior Art
FIG.3B

ARTICLE HAVING DIFFUSER HOLES AND METHOD OF MAKING SAME

BACKGROUND OF THE INVENTION

This invention relates generally to a method for producing a hole in a structure and, more particularly, to an improved method of forming a diffuser section of an airfoil cooling hole by way of rapid electro discharge machining (EDM).

Airfoils, such as turbine blades and vanes, are typically exposed to high temperatures ranging from about 800° C. to 1600° C. within a gas turbine engine. One method of protecting airfoils from such extreme temperature conditions includes film cooling. Film cooling comprises the method of passing pressurized air through cooling holes, thereby allowing the air to pass over the exterior of the airfoil as the combustion gases encounter the airfoil. The geometric shape of the cooling holes includes both cylindrical holes and shaped holes. Cylindrical holes comprise holes generally having a circular cross section through the entire exterior wall of the airfoil, thereby allowing the pressurized air to pass through the airfoil. Manufacturing processes used to manufacture cylindrical holes are discussed in U.S. Pat. No. 6,229,113, which is owned by the assignee of the present invention and hereby incorporated herein by reference.

Shaped holes, alternatively, include both a cylindrical meter section and a diffuser section. The cylindrical meter section allows the pressurized air to pass through the airfoil, and the diffuser section assists in directing the pressurized air over the airfoil's exterior surface. In order to direct the pressurized air as close as possible to the exterior surface of the airfoil, the shape of the diffuser section diverges outwardly from the cylindrical meter section to the airfoil's exterior surface. A plurality of shaped holes are simultaneously formed by a "comb type" EDM electrode having a plurality of "teeth" or electrodes that are advanced into the airfoil.

The present method for manufacturing shaped holes is conventional EDM, wherein an appropriately shaped electrode contacts a structure that is typically immersed in a dielectric fluid. Near contact between the electrode and the structure, combined with a pulsed voltage, creates a spark between the electrode and the structure, thereby causing the structure to erode in the shape of the electrode.

A preferred shape for a diffuser section of an airfoil cooling coil is a flared trapezoidal shape that diverges outwardly from the cylindrical meter section. Accordingly, it has been common to use a shaped EDM electrode which is advanced in a single stroke toward the meter section to obtain a shaped diffuser section with smooth, linear walls.

Although effective, the use of a relatively large shaped electrode was a relatively slow process, and production efficiencies and design limitations required that a different method be devised. Accordingly, a rapid EDM process was developed wherein the larger shaped copper electrode was replaced with a relatively tiny solid or hollow copper or brass tube that reciprocates back and forth across the width of the diffuser section as it advances in steps along the length of the diffuser section to form the trapezoidal shaped diffuser section. However, with this process it is impossible to obtain a trapezoidal shaped opening with a smooth linear wall and instead, the smooth wall is replicated by the formation of staggered steps with a gradual off-setting of the steps as the electrode is advanced toward the meter section. Thus, for a diffuser length of 0.100 inches, the electrode is advanced about 100 times so as to form 100 sub-steps along the wall of the diffuser. This number may be adjusted for design purposes.

From a performance standpoint, the diffuser formed by way of the rapid EDM process is substantially equivalent to the diffuser section formed by way of the shaped electrode. In each case, the diversion angle of the diffuser section is limited to about 10°. If a diffuser is formed having angles greater then 10°, which is desirable for purposes of effective cooling, then the air flowing through the diffuser section will separate from the boundary walls thereof, resulting in inefficient and inadequate cooling of the airfoil.

SUMMARY OF THE INVENTION

Briefly, in accordance with one aspect of the invention, the practice of approximating the smooth conical wall by the electrical discharge machining while advancing the electrodes in minute incremental steps is abandoned and instead, the electrode is advanced in relatively fewer incremental steps across the longitudinal depth of the formed hole to thereby provide relatively longer and deeper, in the radial dimension, notches in the side wall boundaries of the formed holes. In this way, the tendency of the airflow to separate from the walls of the formed hole are lessened such that the included angle of the trapezoidal shaped hole can be increased beyond the usual 10°.

By another aspect of the invention, the number of incremental steps that the electrode is advanced longitudinally toward the work piece is reduced from around 100 to a number in the range of 4-12, and the included angle of the shaped hole can be increased to 30°.

By yet another aspect of the invention, for a diffuser hole formed having a longitudinal depth of about 0.1 inch, the longitudinal length of each notch formed in the side wall is in the range of 0.002 in. to 0.010 in., and the radial depth thereof is in the range of 0.000 inches to 0.006 in.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIGS. 3A and 3B are top view illustrations of "air solid" patterns that represent a diffuser opening formed by way of the prior art method and the present invention, respectively.

DESCRIPTION OF THE PREFERRED EMBODIMENT

Figure 1:
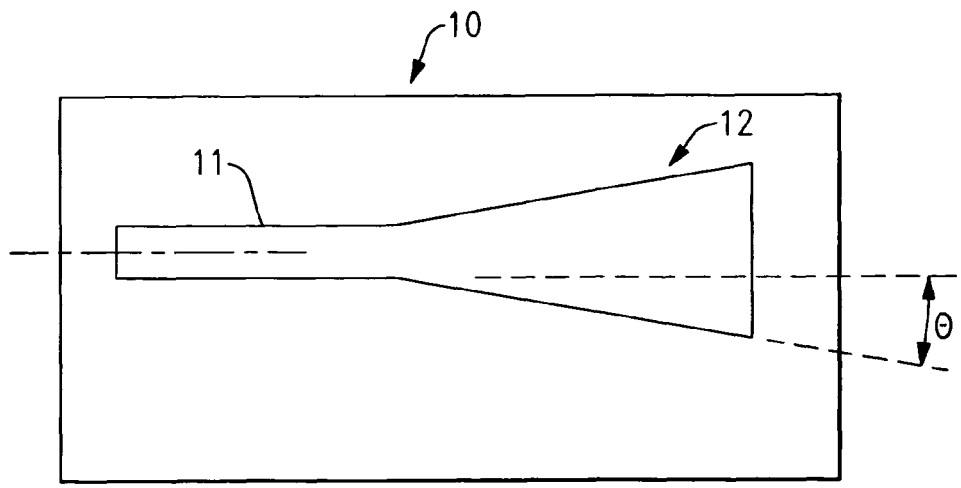
FIG. 1 is an elevational view of a diffuser opening formed in a portion of an airfoil in accordance with the prior art.

Referring now to FIG. 1, a diffuser is shown generally at 10. The diffuser 10 could be used on any suitable article, but will be described herein as being located on an airfoil of a gas turbine engine. The diffuser 10 includes a cylindrical metering hole 11 and a diffuser opening 12 having the shape of a flared trapezoid in cross-section. That is, the cylindrical opening 11 passes through the wall of the airfoil and when it reaches the outer surface thereof, the trapezoidal shaped (in cross-section) diffuser opening 12 allows for the continued flow of the cooling air along the surface of the airfoil to maintain the cooling effect.

The shape of the diffuser opening 12 is defined by the angle θ, which is the angle between the axis C/L of the cylindrical opening 11 and the side walls of the diffuser opening 12. This angle has traditionally been maximized in order to maximize the area over which the cooling air is dispersed across the surface of the airfoil. However, as a practical matter, the angle $\theta$ has been limited to approximately 10° because boundary layer separation typically occurs above that angle.

As will be seen in FIG. 1, a typical dimension for the diameter of the cylindrical hole 11 is 0.015 inches, and a typical longitudinal length of diffuser opening 12 is 0.100 inches. These dimensions may vary, of course, to accommodate any particular application.

Figure 2A:
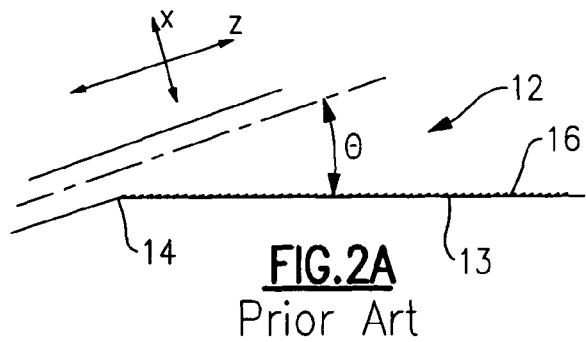
FIGS. 2A, 2B and 2C are schematic illustrations of a diffuser wall surface as formed by way of the prior art method and by way of the present invention, respectively.

As will be seen in FIG. 2A, wherein one side 13 of the diffuser opening 12 is shown for simplicity, the cylindrical opening 11 and the shaped diffuser opening 12 will extend longitudinally along the z-axis, while along the x and y axes, the cylindrical opening 11 is defined by a diameter of x=y, and the diffuser opening 12 is trapezoidally shaped with a defining angle of $\theta$ such that the x-axis dimension (i.e. in the transverse direction) varies along the z-axis from a minimum at the transition point 14, between the cylindrical opening 11 and the diffusion opening 12, to a maximum at the other end of the diffusion opening 12. The y-axis dimension, on the other hand varies from a minimum at the transition point 14 to a maximum at the downstream end thereof.

Diffuser openings 12 have been formed by a rapid EDM process wherein a wire electrode is advanced in small steps along the z-axis, and at each step, it is reciprocated across the across the x-axis to erode the material for the purpose of forming the diffuser opening 12. Since the individual steps or ribs 16 were very small (i.e. on the order of 1 mil, or 100 steps along the longitudinal length of 0.100 inches), a smooth surface on the diffuser wall 13 was approximated. In this regard, it has generally been understood that the cooling effect of the diffusion opening 12 would be maximized by making the steps as small as possible and thereby approximating a smooth wall surface as close as possible. With this process, it is also understood generally, that the angle $\theta$ was limited to 10° because of boundary layer separation that would otherwise occur above this level.

Figure 2B:
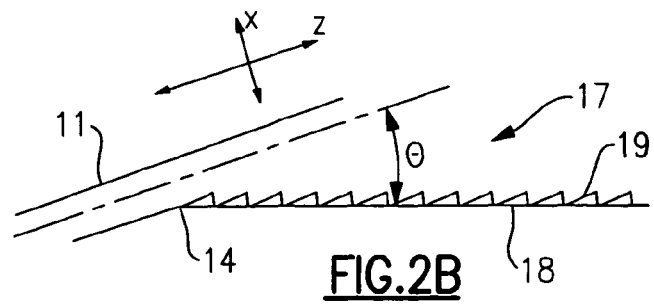

In accordance with an embodiment of the present invention as shown in FIG. 2B, a diffusion opening 17 is formed having sides that no longer approximate a smooth surface but rather define a relatively rough surface. That is, as shown along the one side 18, the individual steps or ribs 19 are relatively ling (i.e. on the order of 10 mil along the z-axis, or 10 steps over a longitudinal length of 0.100 inches).

Figure 2C:
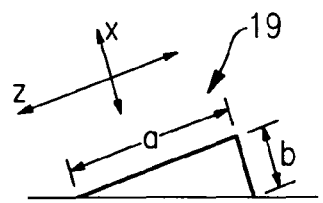

As shown in FIG. 2C, the individual steps 19 have a longitudinal length or "rise" of "a" along the z-axis and a transverse dimension or "run" of "b" along the x-axis as shown. The applicants have found that the number of steps 19 is preferably maintained in the range of 4-12.

The geometry of the diffuser openings 17 has been described in terms of a diffuser opening with a longitudinal length of 0.100 inches. Accordingly, if that length is changed, the number of steps and their dimensions "a" and "b" would be changed accordingly. It has been determined that the diffuser angle $\theta$ may vary from 5° to 30°, the rise dimension "a" may vary from 0.002 inches to 0.010 inches, the run dimension "b" may vary from 0.0000 inches to 0.006 inches, and the ratio of rise to run, a/b, may vary from 1.7 to 12.

While the present invention has been particularly shown and described with reference to preferred and alternate embodiments as illustrated in the drawings, it will be understood by one skilled in the art the various changes and detail may be effected therein without departing from the true spirit and scope of the invention as defined by the claims.

We claim:

1. An airfoil for use in a high temperature environment and having at least one passage for conducting the flow of cooling air from an inner surface to an outer surface thereof, said passage comprising:
    a generally cylindrical hole which passes from its one end through an outer wall of the airfoil to another end to fluidly connect the inner surface to the outer surface of the airfoil; and
    a diffuser opening formed in the airfoil outer surface and extending longitudinally from said cylindrical hole other end to a downstream point on the airfoil outer surface, said diffuser opening having a pair of opposed sidewalls with a plurality of ribs formed therein, with the total number of ribs being in the range of 4 to 12.

2. An airfoil as set forth in claim 1 wherein each of said ribs has a longitudinally extending component and a transversely extending component and further wherein said longitudinally extending component has a dimension in the range of 0.002 inches to 0.010 inches.

3. An airfoil as set forth in claim 2 wherein said transversely extending component has a dimension in the range of 0.000 inches to 0.006 inches.

4. An airfoil as set forth in claim 1 wherein said opposed sidewalls diverge as they extend from said cylindrical hole to thereby form a trapezoidal shaped opening.

5. An airfoil as set forth in claim 4 wherein said sidewalls form an angle $\theta$ with an axis of said cylindrical hole, and further wherein said angle $\theta$ is greater than 10°.

6. An airfoil as set forth in claim 1 wherein each of said ribs has a longitudinally extending component and a transversely extending component, and the ratio of said longitudinally extending component to said transversely extending component is in the range of 1.7 to 12.

7. An airfoil as set forth in claim 5 wherein said angle $\theta$ in the range of 10°-30°.

* * * * *